US010178239B2

(12) United States Patent
Ringberg et al.

(10) Patent No.: US 10,178,239 B2
(45) Date of Patent: Jan. 8, 2019

(54) METHOD FOR FACILITATING PROVISIONING OF SERVICE-RELATED PRODUCTS IN A COMMUNICATION NETWORK

(71) Applicant: Telefonaktiebolaget LM Ericsson (publ), Stockholm (SE)

(72) Inventors: Björn Ringberg, Rödeby (SE); Lars Anglert, Karlskrona (SE); Karin Hoel, Karlskrona (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/554,570

(22) PCT Filed: Mar. 13, 2015

(86) PCT No.: PCT/SE2015/050289
§ 371 (c)(1),
(2) Date: Aug. 30, 2017

(87) PCT Pub. No.: WO2016/148613
PCT Pub. Date: Sep. 22, 2016

(65) Prior Publication Data
US 2018/0077292 A1     Mar. 15, 2018

(51) Int. Cl.
*H04M 15/00* (2006.01)
*H04L 12/14* (2006.01)
*H04W 4/24* (2018.01)

(52) U.S. Cl.
CPC ........ *H04M 15/66* (2013.01); *H04L 12/1407* (2013.01); *H04M 15/00* (2013.01);
(Continued)

(58) Field of Classification Search
CPC ............... H04L 2209/56; H04L 9/3234; H04L 51/046; H04L 65/403; H04L 5/0007;
(Continued)

(56) References Cited

U.S. PATENT DOCUMENTS 8,019,683 B1    9/2011  Swanburg et al.
2012/0039450 A1*  2/2012  Labuda ................. H04M 15/43
                                                                379/114.03
(Continued)

FOREIGN PATENT DOCUMENTS

EP    2296309    3/2011
EP    2605501    6/2013

OTHER PUBLICATIONS

International Search Report and Written Opinion of the International Searching Authority, International Application No. PCT/SE2015/050289, dated Dec. 18, 2015, 13 pages.
(Continued)

*Primary Examiner* — Nimesh Patel
(74) *Attorney, Agent, or Firm* — Sage Patent Group

(57) ABSTRACT

Disclosed is a method performed by a policy control server of a communication network to facilitate provisioning of service-related products in the communication network. The method comprises receiving, from a node of the communication network, a policy settings request message, requesting charging policy settings for service-related products of a subscriber of the communication network, the message comprising a subscriber identity, obtaining, based on the received subscriber identity, information of a number of first service-related products that are provision-capable for the subscriber, and selecting, based on the information of the obtained number of first products, a number of second service-related products that are tentative for the subscriber. The method further comprises obtaining, in response to the selection, policy settings for the number of second products,
(Continued)

and sending, to the communication network node, the obtained policy settings for the number of second products.

18 Claims, 6 Drawing Sheets

(52) U.S. Cl.
CPC ........... H04M 15/60 (2013.01); H04M 15/61 (2013.01); H04W 4/24 (2013.01); *H04L 12/1435* (2013.01); *H04L 12/1439* (2013.01)

(58) Field of Classification Search
CPC ..... H04L 67/306; H04L 45/54; H04L 45/566; H04L 45/586; H04L 61/302; H04L 65/1073; H04L 67/24; H04L 67/303; H04L 12/14; H04L 43/028; H04L 43/04; H04L 43/062; H04L 43/065; H04L 63/0492; H04M 15/31; H04M 15/66; H04M 15/785; H04M 15/80; H04M 15/8022; H04M 15/81; H04M 15/8214; H04M 15/8271; H04M 15/835; H04M 15/84; H04M 15/85
See application file for complete search history.

(56) References Cited

U.S. PATENT DOCUMENTS

| | | | |
|---|---|---|---|
| 2012/0088476 A1* | 4/2012 | Greenfield | H04W 4/50 455/414.1 |
| 2012/0229647 A1* | 9/2012 | Calman | G08B 13/19615 348/158 |
| 2013/0151710 A1* | 6/2013 | D'souza | H04L 41/08 709/226 |
| 2014/0280954 A1 | 9/2014 | Yu et al. | |
| 2015/0087260 A1* | 3/2015 | Lowenadler | H04W 4/26 455/406 |

OTHER PUBLICATIONS

Supplementary European Search Report, EP 15885691.4, dated Oct. 30, 2018, 9 pages.
"Clarification on PCC Rule Authorization for SDFs Not Known at PCRF," Change Request, 29.212 CR 132, Rev 1, Current Version: 7.5.0, (XP050312341) 3GPP TSG-CT WG3 Meeting #49, Budapest, Hungary, Aug. 18-22, 2008 (C3-081500) 3 pages.

* cited by examiner

METHOD FOR FACILITATING PROVISIONING OF SERVICE-RELATED PRODUCTS IN A COMMUNICATION NETWORK

CROSS REFERENCE TO RELATED APPLICATIONS

This application is a 35 U.S.C. § 371 national stage application of PCT International Application No. PCT/SE2015/050289, filed on Mar. 13, 2015, the disclosure and content of which is incorporated by reference herein in its entirety.

TECHNICAL FIELD

The present disclosure relates generally to methods, policy control servers and computer programs for facilitating provisioning of service-related products in a communication network.

BACKGROUND

In a communication network of today, certain communication services may be offered to the subscribers of the communication network according to "product offerings." For example, the communication service "mobile broadband connectivity" may be offered to individual subscribers of a cellular or other wireless or wired communication network in defined blocks of time, e.g., hourly, wherein one such hourly offering can be seen as a product offering. Additionally, or alternatively, the product offering may be based on discrete blocks of data transfer amounts.

The product offerings are provisioned in advanced (pre-provisioned) in the subscriber database responsive to subscriber input, e.g., pre-purchased through a web portal, or they are pre-provisioned based on scheduled or automatic processing running within the communication network. Because usage of a product-related service is authorized for a given subscriber conditioned on there being related products already provisioned for that subscriber, the network operator is obliged to provision and store potentially large numbers of products in its subscriber database, which requires lots of storage space.

For example, for a mobile broadband service having an offering in which connectivity is provided in one-hour increments, the communication network operator might, for each subscriber that is eligible for the service, provision twenty-four products to cover the next twenty-four hour usage period. Each such product corresponds to a specific one of the hours and is tied to a corresponding one of the eligible subscribers. Similarly, the network operator may make a product offering in which subscribers are allowed 1 GB of data transfer per month, where usage is assessed in 25 MB increments.

With this approach, all the subscribers that have signed up for a given offer have to have their corresponding products available for authorizing actual service usage and all such products must be stored in advance in the subscriber database. Product storage quickly becomes burdensome. To cover the 24-hour and/or monthly data transfer product offering described above, the network operator would generate from twenty-four to forty products per subscriber, depending on which product offering the subscriber selected. Not all of these products may be used, and they may later need to be removed. Example numbers of 6 000 000 subscribers and fifty bytes of storage required per product imply storage requirements of 7.2 GB to 12 GB for the pre-provisioned products. That amount of data is prohibitive, particularly because of the way subscriber databases are used in real-time within the network charging systems.

Recently, a concept called automatic provision of products for communication services has been introduced. Briefly, this new feature means that products can be provisioned in the same moment as they are needed. These automatically provided products are based on an existing base product and created on demand by traffic events or sessions. In other words, the automatically provided products do not exist for the subscriber in the network until they are created on demand. With such a concept, only the existing base product needs to be provisioned in advance and the rest of the products are provisioned when needed. Thereby, the amount of data that needs to be stored in advance, as in the example above, can be lowered considerably.

With the automatically provided products, the handling of policy setting gets complicated. According to 3GPP TS 23.203 V13.2.0, policy settings for any product are today transferred from the policy control server to a core network node, which may be a GGSN, upon an initial request from the core network node. However, the current policy logic of the charging system can only retrieve settings for existing products. This means that when the concept automatic provisioning of products is used, only the policy settings for the base product and not the policy settings for the automatic provisioned products are retrieved and reported back to the GGSN in response to the received initial request.

Then when the subscriber signals to the network that he/she wants to use such a service/product, the GGSN does not have any policy settings for the product and may then either have to wait until such a policy setting is received, which may correspond to a charging interval of minutes or hours, before it provides the user with the policy corresponding to the product, or it may provide the user with a default policy that probably does not correspond to what the operator has promised the subscriber according to the offering of the product. Consequently, there is a need for a more efficient handling of products, and more specifically of product policies in a policy control system of a communication network.

SUMMARY

It is an object of the invention to address at least some of the problems and issues outlined above. It is an object to facilitate handling of service-related products in a communication network. It is an object to provide an efficient handling of automatically provisioned service-related products in a policy control and charging system of a communication network. It is possible to achieve at least one of these objects by using a method and a policy control server as defined in the attached independent claims.

According to one aspect, a method is provided performed by a policy control server of a communication network, for facilitating provisioning of service-related products in the communication network. The method comprises receiving, from a node of the communication network, a policy settings request message, requesting charging policy settings for service-related products of a subscriber of the communication network, the message comprising a subscriber identity, obtaining, based on the received subscriber identity, information of a number of first service-related products that are provision-capable for the subscriber, and selecting, based on the information of the obtained number of first products, a number of second service-related products that are tentative for the subscriber. The method further comprises obtaining, in response to the selection, policy settings for the number of second products, and sending, to the communication network node, the obtained policy settings for the number of second products.

According to another aspect, a policy control server is provided, operable in a communication network, the server being configured for facilitating provisioning of service-related products in the communication network. The policy control server comprises a processor and a memory, said memory containing instructions executable by said processor, whereby the policy control server is operative for receiving, from a node of the communication network, a policy settings request message, requesting charging policy settings for service-related products of a subscriber of the communication network, the message comprising a subscriber identity, obtaining, based on the received subscriber identity, information of a number of first service-related products that are provision-capable for the subscriber, and selecting, based on the information of the obtained number of first products, a number of second service-related products that are tentative for the subscriber. The memory further contains instructions executable by said processor, whereby the policy control server is operative for obtaining, in response to the selection, policy settings for the number of second products, and sending, to the communication network node, the obtained policy settings for the number of second products.

According to another aspect, a policy control server is provided operable in a communication network, configured for facilitating provisioning of service-related products in the communication network. The policy control server comprises a receiving module for receiving, from a node of the communication network, a policy settings request message, requesting charging policy settings for service-related products of a subscriber of the communication network, the message comprising a subscriber identity, a first obtaining module for obtaining, based on the received subscriber identity, information of a number of first service-related products that are provision-capable for the subscriber, and a selecting module for selecting, based on the information of the obtained number of first products, a number of second service-related products that are tentative for the subscriber. The policy control server further comprises a second obtaining module for obtaining, in response to the selection, policy settings for the number of second products, and a sending module for sending, to the communication network node, the obtained policy settings for the number of second products.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to facilitate handling of service-related products in a communication network. Especially, a solution is provided to facilitate handling of automatically provisioned service-related products. This may be achieved by a policy control server, which may be an Online Charging System, OCS and/or a Policy and Charging Rules Function, PCRF. The policy control server may be arranged to, already when receiving a policy settings request message from the core network, speculate which automatically provisioned service-related products that may be used by a subscriber. The speculated products (also called second products) may be speculated based on which base product (also called first product) the subscriber has. The speculated products (also called second products) may also be speculated based on which product (also called first product) that is associated with a certain subscriber category to which the subscriber belongs. The policy settings for the speculated second products may then be obtained and sent to the core network node. As a result, the core network, e.g. the Gateway GPRS, Support Node, GGSN, may provide the second product to the subscriber with the correct policy settings directly when receiving a request for the second product.

Figure 1:
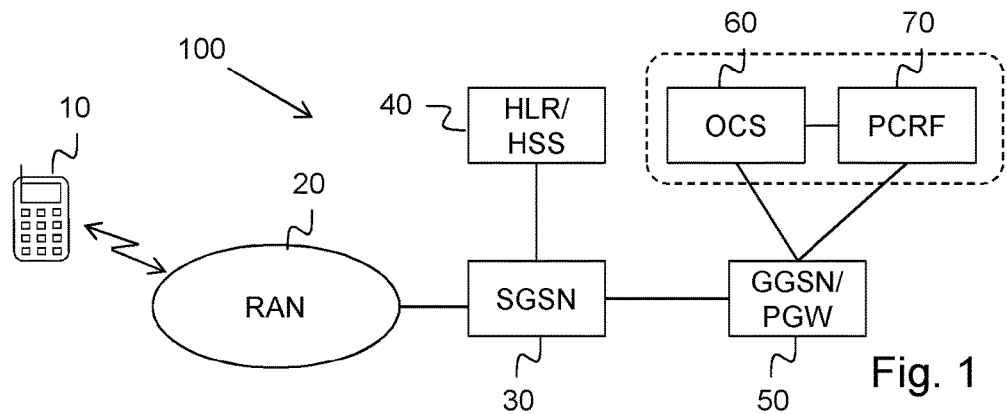
FIG. 1 is a block diagram of an exemplary communication network in which the present invention may be used.

FIG. 1 shows an architecture of a communication network 100 in which the present invention may be used. The communication network shown is a packet data communication network. The communication network 100 comprises a radio access network, RAN, 20 that has a number of base station (not shown) providing wireless connection to the network for mobile stations 10. The RAN may further have other nodes such as a Radio Network Controller in 3G networks, a Base station Controller in GSM networks or a Mobility Management Entity, MME in Long Term Evolution, LTE, networks (also called 4G) for controlling the base stations and connecting the RAN to a core network. The core network has a Serving GPRS Support Node, SGSN, 30 connected to the RAN 20 and to a Home Location Register, HLR or a Home Subscriber Server, HSS 40. The core network further has a GGSN (3G) or Packet data network Gateway, PGW (4G) 50 connected to the SGSN. The GGSN/PGW is further connected to a charging system comprising an OCS 60 and a PCRF 70. The functions of the OCS and the PCRF may either be arranged in separate units or integrated into the same unit.

Figure 2:
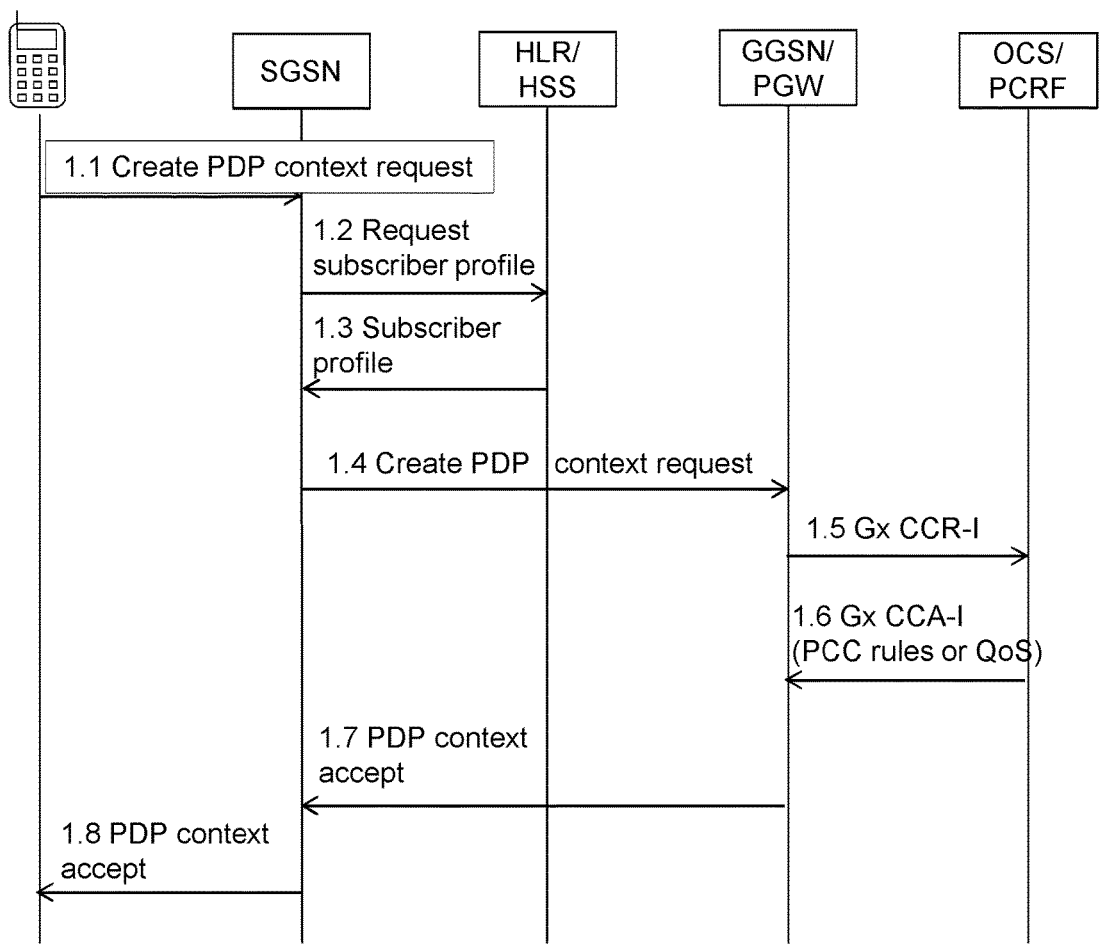
FIG. 2 is a signaling diagram illustrating prior art signaling in the exemplary communication network.

FIG. 2 shows an overview of signals sent in a possible handling of policies for service-related products in a communication system. In response to a subscriber turning on his/her mobile station, a session is started and the mobile station sends a request 1.1 for creating of a PDP context to the SGSN. When receiving the PDP context request, the SGSN requests 1.2 subscriber profile data from the HLR/HSS. The HLR/HSS answers back 1.3 with the subscriber profile data including default QoS settings for the subscriber. Thereafter, the SGSN sends the request 1.4 for creating a PDP context to the GGSN, including the subscriber profile information. In response, the GGSN sends 1.5 a Gx session initiate towards the OCS/PCRF node. Gx is an interface between PCEF and PCRF according to 3GPP, i.e. the Gx initiate message relates to policy functionality of the policy control server. The OCS/PCRF evaluates the available service-related products offers to determine the applicable policy settings. However, when the concept of automatic provision of products is activated only the base products and not the automatically provisioned products will be detected, since the latter are not pre-provisioned as the base products are. The automatically provisioned products are created in the same moment as they are needed. The OCS/PCRF then responds back to the Gx session initiate by sending 1.6 the policy settings for the base product in a Gx Credit Control Request—Initiate, CCR-I to GGSN. Thereafter, the GGSN sends 1.7 a PDP context accept back to SGSN with the policy settings of the base product, and the SGSN sends 1.8 the PDP context accept back to the subscriber.

Figure 3:
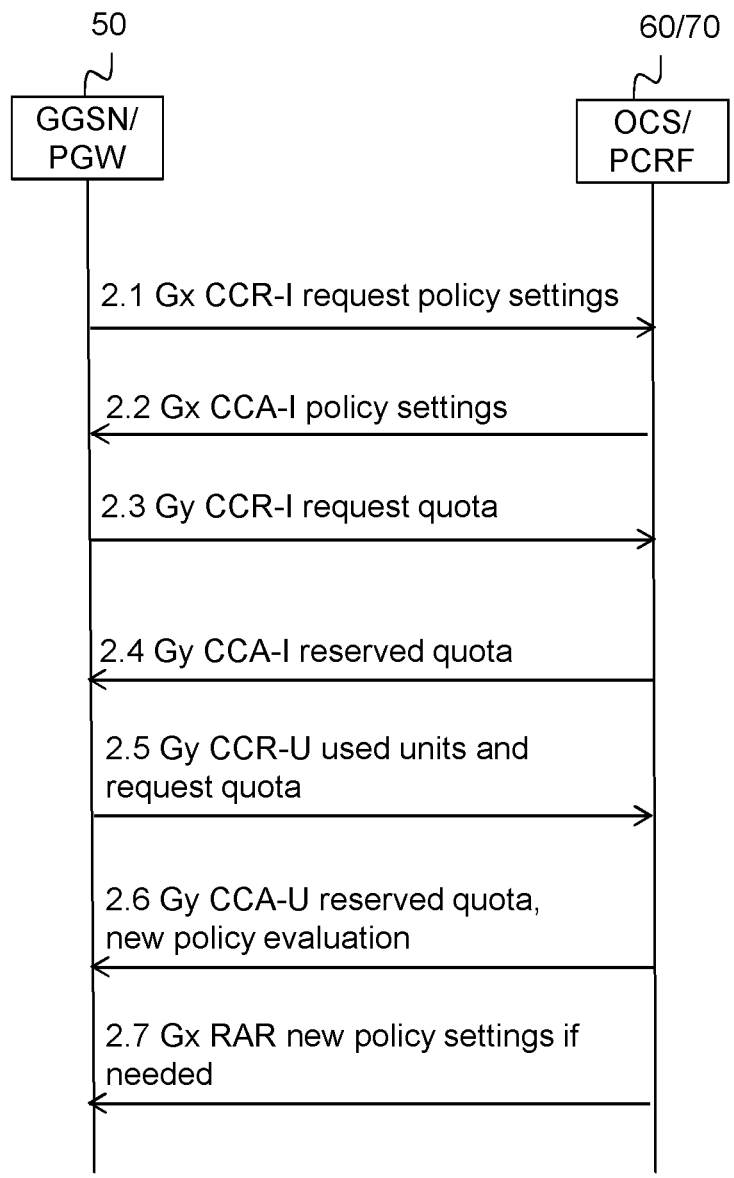
FIG. 3 is another signaling diagram illustrating prior art signaling in the exemplary communication network.

As shown, automatically provisioned products will not be found when the policy logic is executed, i.e. when a Gx initial has arrived and a policy evaluation is done to set up the Gx session. Therefore, policy setting for these coming automatic provisioned products will not be reported back to GGSN. FIG. 3 shows prior art communication between the GGSN/PGW 50 and the OCS/PCRF 60, 70. 2.1 is the Gx initiate when policy settings are requested, similar to step 1.5 2.2 is the response with the policy setting for the base product sent by the OCS/PCRF towards the GGSN/PGW, similar to step 1.6. When a subscriber wants to start using an automatically provisioned product, the GGSN sends 2.3 a Gy CCR initial to the OCS/PCRF to request quota from the subscriber's account. Gy is an interface between PCEF and OCS according to 3GPP, i.e. the CCR initial message relates to charging functionality of the policy control server. The OCS/PCRF responds 2.4 by a Gy CCA initial informing of reserved quota. However, since the automatically provisioned products are not detected, as they are only speculated, no policy evaluation will be performed for the automatically provisioned products and consequently no policies for the automatically provisioned products will be sent to the GGSN. It is not until the Gy CCR update 2.5 is sent from the GGSN, to use and request quota, which triggers that the automatic provisioned product is not in speculated state any longer, that a policy evaluation is performed for the automatically provisioned product. If the policy is changed then a policy update is triggered. Then when the OCS/PCRF sends 2.7 the Gx Re-Authentication Request, RAR, it appends the policy settings for the automatically provisioned product, if a policy update has been triggered. Consequently, in the time between Gy initial 2.3 and the time when a policy update is sent in the Gx-RAR 2.7, a wrong policy setting may have been applied. This could be a main drawback for the subscriber if the subscriber wants to stream a video or similar.

Figure 4:
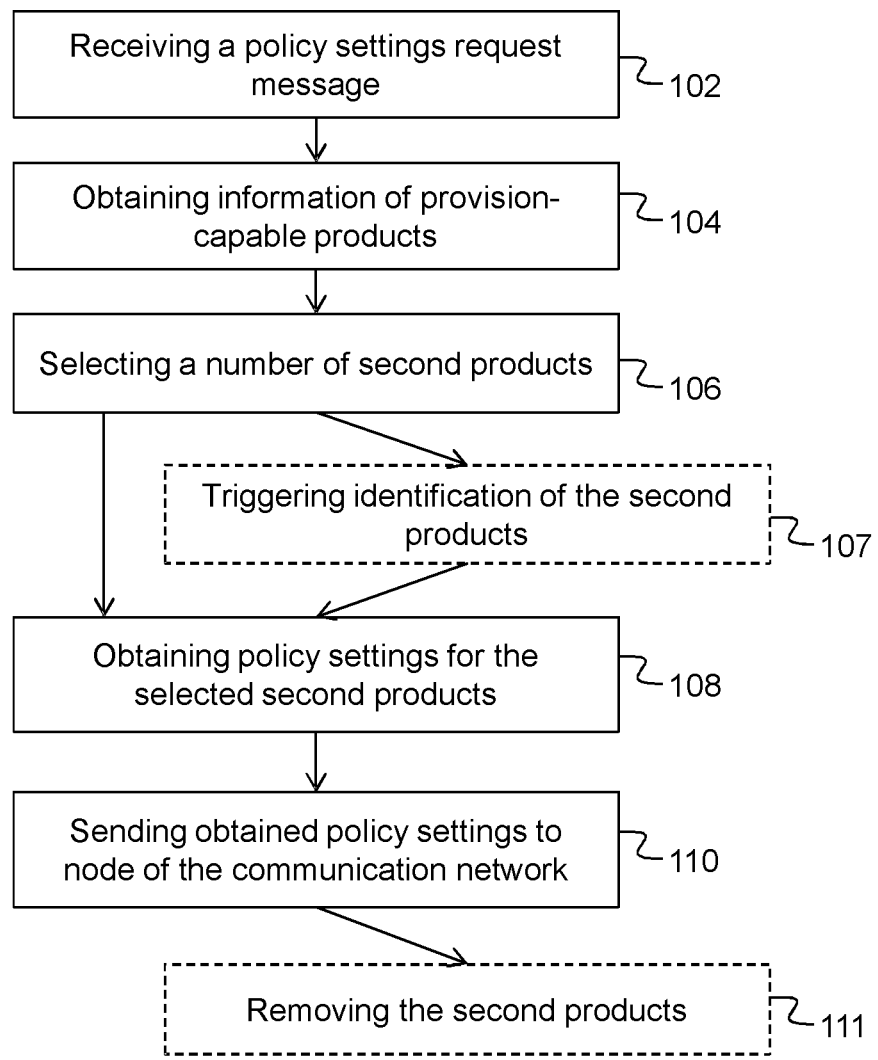
FIG. 4 is a flow chart illustrating a method performed by a policy control server, according to possible embodiments of the invention.

In the following, an embodiment of a solution to this drawback is provided. FIG. 4 describes a method performed by a policy control server 60, 70 (FIG. 1) of a communication network 100 for facilitating provisioning of service-related products in the communication network. The method comprises receiving 102, from a node 50 of the communication network, a policy settings request message requesting charging policy settings for service-related products of a subscriber of the communication network, the message comprising a subscriber identity, and obtaining 104, based on the received subscriber identity, information of a number of first service-related products that are provision-capable for the subscriber. The method further comprises selecting 106, based on the information of obtained number of first products, a number of second service-related products that are tentative for the subscriber, obtaining 108, in response to the selection, policy settings for the number of second products and sending 110, to the communication network node 50, the obtained policy settings for the number of second products.

The communication network may be a packet data communication network. A communication service may be a certain amount of megabyte, a certain bandwidth, a number of text messages, a certain type of service such as video-on-demand that the user has paid for etc. The communication service may be packaged to a subscribed as a so called service-related product. The policy control server is arranged to provide policy settings for products to the GGSN/PGW. The policy control server may be an OCS or a PCRF or a combination of an OCS and a PCRF. The policy control server may also be called a charging system node. The communication network node may be a packet data network node. The communication network node may be a GGSN and/or a PGW, or a Policy Charging Enforcement Function, PCEF. A second product that is tentative for the subscriber signifies that the second product is not yet provided to the subscriber but that the subscriber has the possibility to start using the second product when the subscriber has the first product. Such second products may be products provided through the newly introduced Automatic provisioning concept. Such a tentative product may be in a so called speculated state. The speculated state may signify that the subscriber has an option to use the second product but has not yet started to use it but he/she can initiate the second product whenever he/she wants, as long as the subscriber has the first product. The policy settings request message may be a Gx initial message. Gx is the communication interface between the PCRF and the GGSN/PCEF according to 3GPP TS 29.212. The information of a number of first service-related products may be obtained 104 from a subscriber database connected to the OCS/PCRF. The policy settings for the number of second products may be obtained from a policy settings database connected to the OCS/PCRF.

By the policy control server obtaining and providing to the communication network node, policy settings for tentative products for the subscriber already in response to receiving a policy request from the communication network, it is possible to provide the subscriber with the tentative product in the same moment as the subscriber requests the tentative product (via e.g. a Gy initial request message). In prior art on the other hand, the tentative policy cannot be provided to the subscriber in response to a request from the communication network node. Since in the current solution the communication network node has received the policies already for this tentative product, when the actual service of the service-related product is requested, the communication network node can provide the service to the subscriber using the correct policy settings directly and do not have to wait for the policy settings or risking providing the service with wrong policy settings. Further, the signaling between the policy control server and the communication network node is reduced.

According to an embodiment, the selecting 106 of the number of second products is also based on one or more charging parameters based on parameters in the charging system. The one or more charging parameters may be taken from the following group of parameters: time of day, subscriber account balance, day of the week, location of the subscriber. Subscriber account balance may signify how much money there is on the subscriber's account. By such a characteristic, it is possible to select the second tentative products on other parameters than only using the subscriber's base product type. This may result in an even more relevant selection of second products. An example of use of the time of day condition is that a base product may provide one of a number of different second products, with different policy settings, based on a certain time. Another more detailed example is that a subscriber has a service-related product that gives access to a high-speed movie service Saturday evenings. The policy settings for this product will be speculated and provided to GGSN before usage of the actual service and before the product is provisioned in OCS, i.e. when the subscriber starts using the service (Gy).

In the following, an example of subscriber account balance for a service called micro billing daily is shown. In this service, the subscriber can enjoy one of a number of daily service-related products based on his account balance. If the subscriber balance is below 2 €, then product 2 with a low bandwidth policy applies; if the subscriber balance is equal or above 2 €, product 1 with a higher bandwidth policy applies.

According to an embodiment, the method further comprises triggering to identify 107 the number of second products in response to the selection 106, wherein the identifying of the number of second products triggers the obtaining 108 of the policy settings for the second products. A product provisioning logic may be triggered to identify the second products.

According to an alternative of this embodiment, the method further comprises removing 111 the identified number of second products in response to the sending 110 of the obtained policy settings to the communication network node. In the case where the second product was identified to trigger the obtaining of its policy settings, the identified second service is removed again after the settings have been sent to the communication network node. Thereby, storage space is saved.

According to another embodiment, the method further comprises receiving a request from the communication network node for one of the number of second products, the request using the sent policy settings for the one of the number of second products, and providing the one of the number of second products to the communication network node. The request received from the communication network node may be a Gy initial message. After the one of the number of second products has been provided to the communication network node, the policy control server may set the one of the number of second products to state "provisioned".

Figure 5:
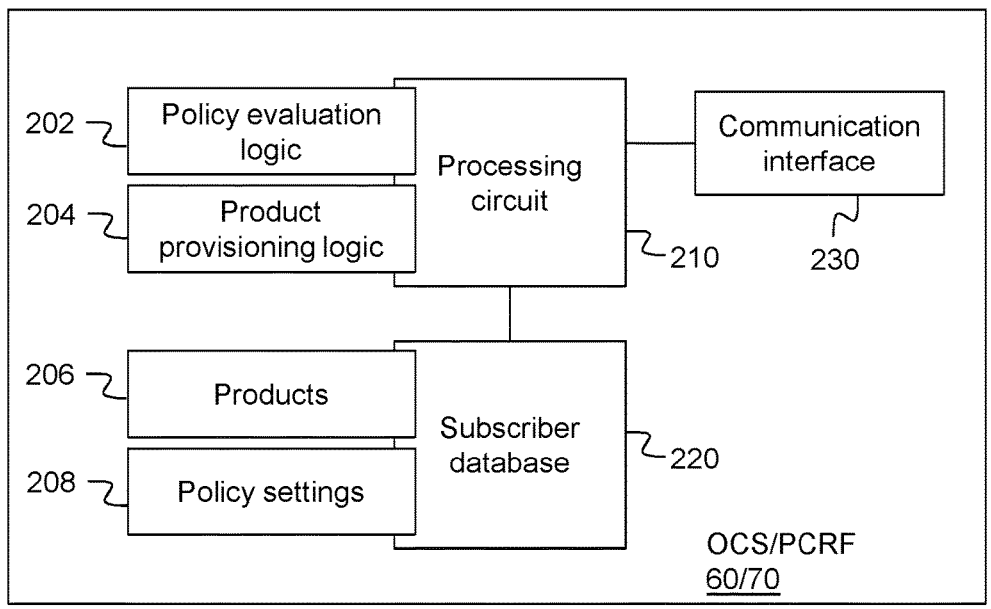
FIG. 5 is a block diagram illustrating a policy control server in more detail, according to possible embodiments.

FIG. 5 shows an embodiment of an OCS/PCRF 60/70 in more detail. This embodiment of the OCS/PCRF comprises a processing circuit 210 having a policy evaluation logic 202 and a product provisioning logic 204. The OCS/PCRF further comprising a subscriber database 220 connected to the processing circuit 210 having a product storage 206 and a policy settings storage 208. The OCS/PCRF further comprises a communication interface 230 connected to the processing circuit 210. The communication interface 230 is arranged to communicate with other nodes in the communication network such as the communication network node.

Figure 7:
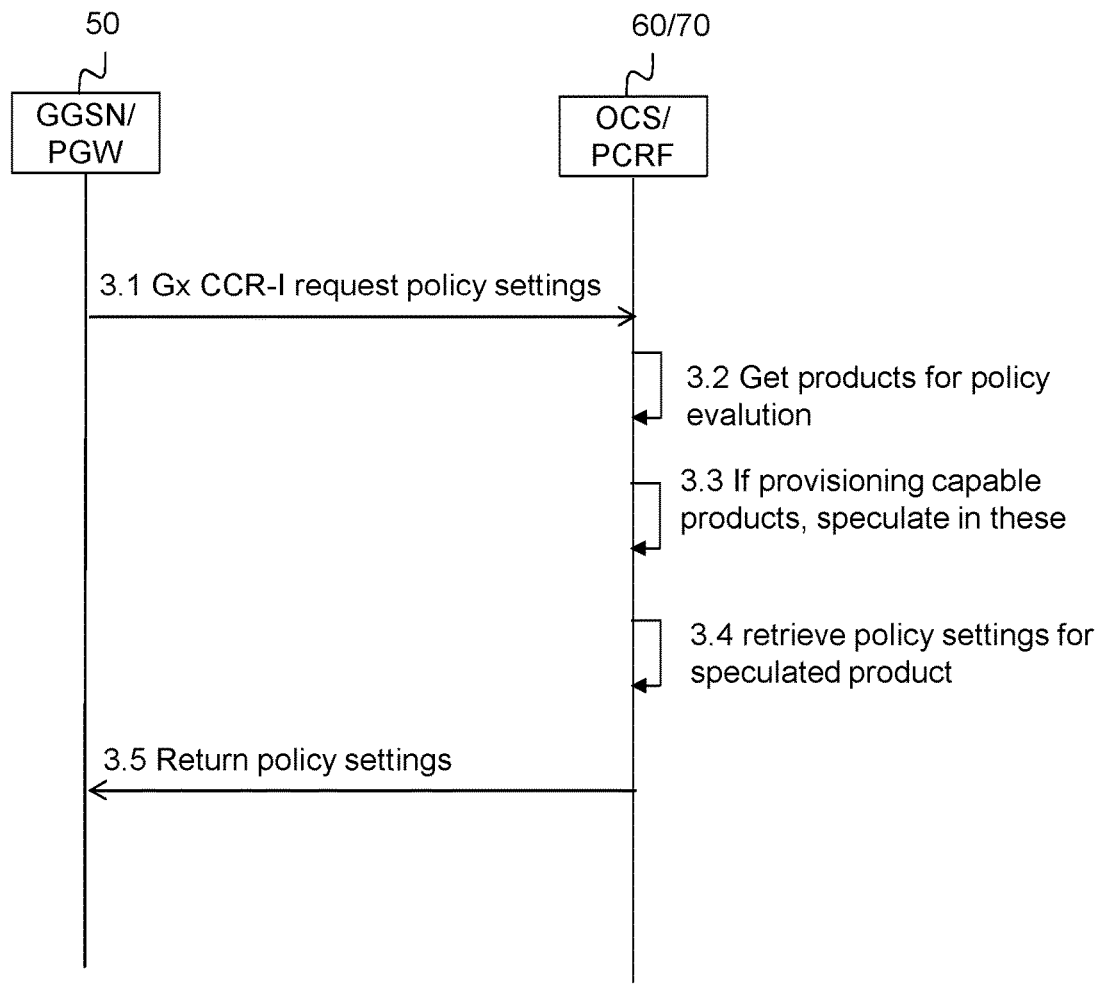
FIG. 7 is a signaling diagram illustrating exemplary method steps according to possible embodiments.

FIG. 7 shows signaling between the GGSN/PGW and the OCS/PCRF according to an embodiment. When the OCS/PCRF receives 3.1 a Gx initial from the GGSN/PGW comprising a subscriber ID, the policy evaluation logic 202 starts a policy evaluation and policy settings for the base products for this subscriber are retrieved 3.2 from the subscriber database 220. The Gx initial may be sent to get policy settings at start of session. If there are provisioning capable products (i.e. second service-related products), the product provisioning logic 204 will then speculate 3.3 in which of these products that will be provisioned if a traffic event will occur, by identifying such a speculated product to the subscriber, i.e. tagging the speculated product to the subscriber. The policy settings for this speculated product is retrieved 3.4 from the policy settings storage 208 and reported back 3.5 to GGSN. The speculated products that have been used for policy decisions will be removed as soon as the policy settings have been sent to the GGSN. There is no reason to keep the speculated products because it is not known when the traffic starts.

Figure 6:
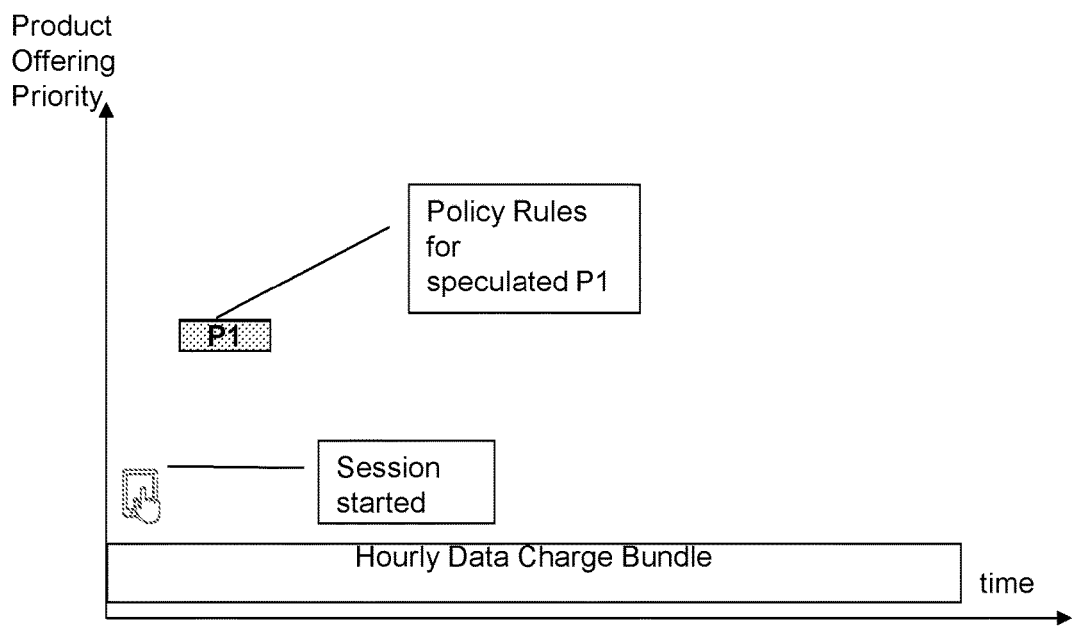
FIG. 6 is a diagram having time on the x-axis and product offering priority on the y-axis.

According to another embodiment as shown in FIG. 6, the time flow of products are shown. During the whole time a base product called Hourly data charge bundle is provisioned to the subscriber. When the subscriber starts a session, i.e. the subscriber's mobile is switched on, the GGSN send a Gx initial to the OCS/PCRF for a policy evaluation. At this moment the subscriber has only the base product. The policy evaluation logic finds the base product which is provision capable. Based on the found base product, the product provisioning logic is triggered from the policy evaluation logic and speculates (or sets up) a new product P1. The policy evaluation logic retrieves the policy settings for the speculated product P1. The speculated product P1 will be removed as soon as the policy evaluation is done. As shown in FIG. 6 the product P1 is only existing during a short time span. Next step is to return the policy settings to the GGSN in the answer of the Gx initial. In the scenario above there is only one policy setting returned, since the base offer does not have policy settings. However, the subscriber could have several products and then several policy settings will be returned back to the GGSN.

Figure 8:
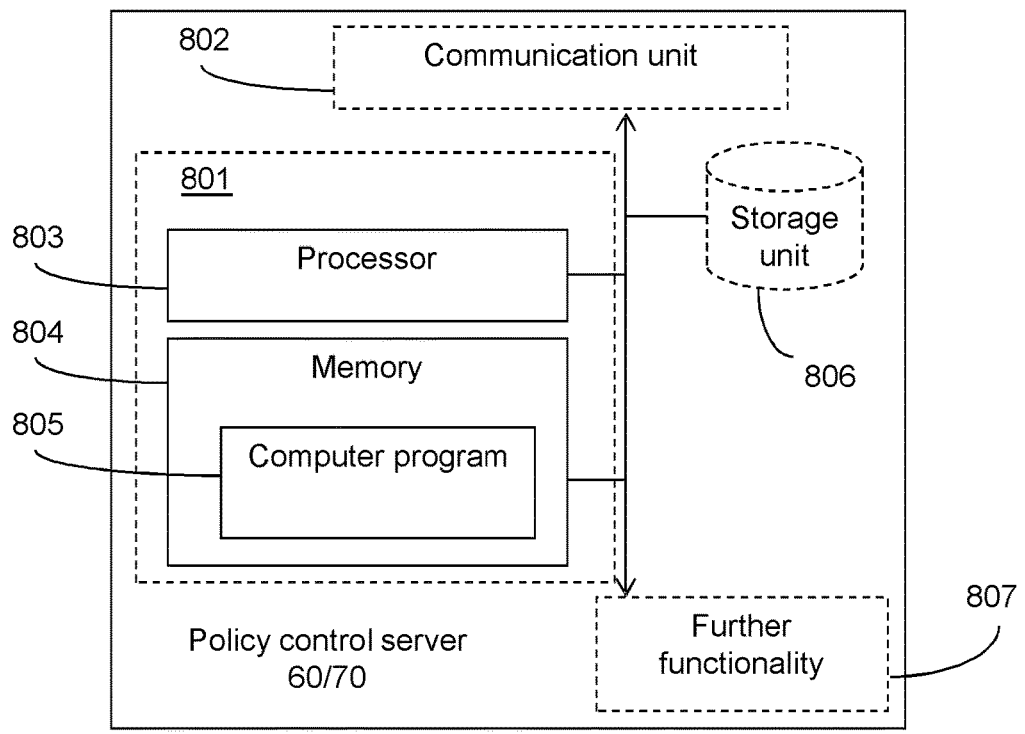
FIGS. 8 and 9 are block diagrams illustrating two versions of a policy control server according to possible embodiments.

FIG. 8 describes an embodiment of a policy control server 60, 70 operable in a communication network 100, the policy control server being configured for facilitating provisioning of service-related products in the communication network. The policy control server comprises a processor 803 and a memory 804. Said memory contains instructions executable by said processor, whereby the policy control server is operative for receiving, from a node 50 of the communication network, a policy settings request message, requesting charging policy settings for service-related products of a subscriber of the communication network, the message comprising a subscriber identity, obtaining, based on the received subscriber identity, information of a number of first service-related products that are provision-capable for the subscriber, and selecting, based on the information of the obtained number of first products, a number of second service-related products that are tentative for the subscriber. The memory further contains instructions executable by said processor, whereby the policy control server is operative for obtaining, in response to the selection, policy settings for the number of second products, and sending, to the communication network node 50, the obtained policy settings for the number of second products.

According to an embodiment, the selecting of the number of second products may also be based on one or more charging parameter. The one or more charging parameters may be taken from the following group of parameters: time of day, subscriber account balance, day of the week, location of the subscriber.

According to another embodiment, said memory 804 further contains instructions executable by said processor, whereby the policy control server is operative for triggering to identify the number of second products in response to the selection, wherein the identifying of the number of second products triggers the obtaining of the policy settings for the second products.

According to another embodiment, said memory 804 further contains instructions executable by said processor, whereby the policy control server is operative for removing the identified number of second products in response to sending the obtained policy settings to the communication network node.

According to another embodiment, said memory 804 further contains instructions executable by said processor, whereby the policy control server is operative for receiving a request from the communication network node for one of the number of second products, the request using the sent policy settings for the one of the number of second products, and providing the one of the number of second products to the communication network node.

The policy control server 60, 70 may further comprise a communication unit 802, which may be considered to comprise conventional means for communicating from and/or to other nodes in the communication network, such as the communication network node 50. The communication unit 802 may comprise one or more communication ports for communicating with the other nodes in the network. The policy control server may further comprise one or more storage units 806 and further functionality 807 useful for the policy control server to serve its purpose as policy control server. The instructions executable by said processor may be arranged as a computer program 805 stored in said memory 804. The processor 803 and the memory 804 may be arranged in an arrangement 801. The arrangement 801 may be a micro processor and adequate software and storage therefore, a Programmable Logic Device, PLD, or other electronic component(s)/processing circuit(s) configured to perform the actions, or methods mentioned above.

The computer program 805 may comprise computer readable code means, which when run in the policy control server causes the policy control server to perform the steps described in any of the described embodiments. The computer program may be carried by a computer program product connectable to the processor. The computer program product may be the memory 804. The memory 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 804. Alternatively, the computer program may be stored on a server or any other entity connected to the communication network to which the policy control server has access via its communication unit 802. The computer program may then be downloaded from the server into the memory 804.

Figure 9:
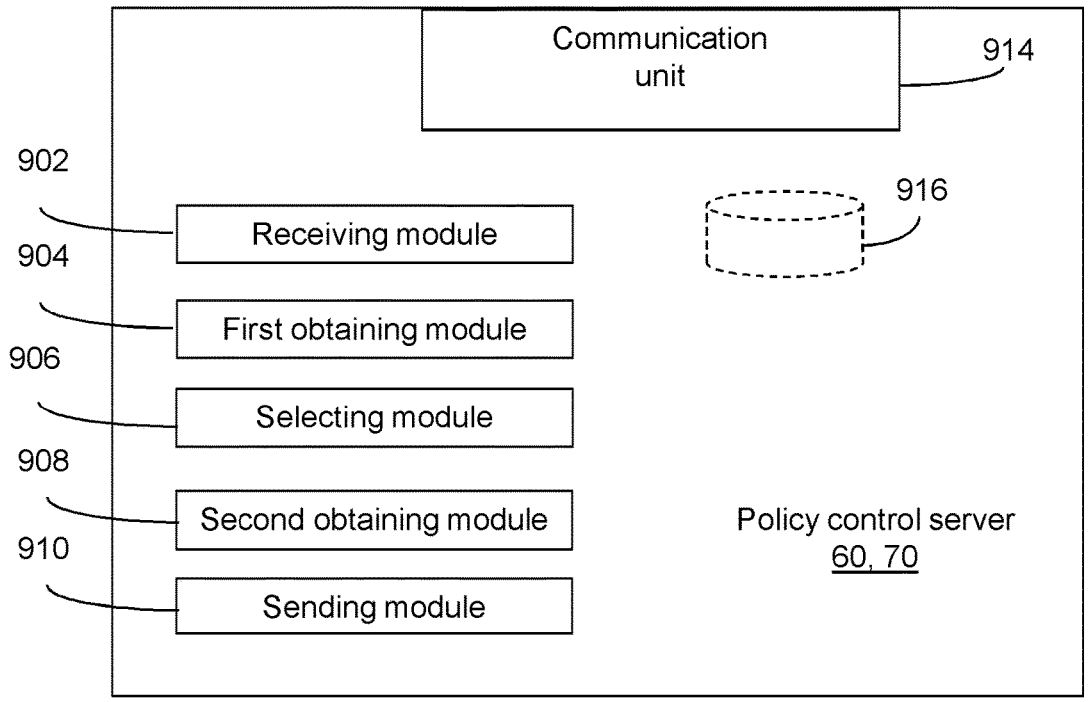

FIG. 9 describes another embodiment of a policy control server 60, 70 operable in a communication network 100, configured for facilitating provisioning of service-related products in the communication network. The policy control server comprises a receiving module 902 for receiving, from a node 50 of the communication network, a policy settings request message, requesting charging policy settings for service-related products of a subscriber of the communication network, the message comprising a subscriber identity, a first obtaining module 904 for obtaining, based on the received subscriber identity, information of a number of first service-related products that are provision-capable for the subscriber, and a selecting module 906 for selecting, based on the information of the obtained number of first products, a number of second service-related products that are tentative for the subscriber. The policy control server further comprises a second obtaining module 908 for obtaining, in response to the selection, policy settings for the number of second products, and a sending module 910 for sending, to the communication network node 50, the obtained policy settings for the number of second products. The mentioned modules may be software or hardware modules. The hardware modules may be arranged on e.g. an Application Specific Integrated Circuit, ASIC.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a policy control server of a communication network to facilitate provisioning of service-related products in the communication network, the method comprising:
   receiving, from a node of the communication network, a policy settings request message, requesting charging policy settings for service-related products of a subscriber of the communication network, the message comprising a subscriber identity associated with the subscriber;
   obtaining, based on the received subscriber identity, information of a number of first service-related products that are provision-capable for the subscriber;
   selecting, based on the information of the obtained number of first products, a number of second service-related products that are tentative for the subscriber;
   obtaining, in response to the selection, policy settings for the number of second service-related products;
   sending, to the communication network node, the obtained policy settings for the number of second service-related products; and
   removing the selected number of second service-related products and the policy settings for the selected number of second service-related products from a database of the policy control server in response to sending the obtained policy settings to the communication network node.

2. The method according to claim 1, wherein the selecting of the number of second service-related products is also based on one or more charging parameter.

3. The method according to claim 2, wherein the one or more charging parameter is taken from the following group of parameters: time of day, subscriber account balance, day of the week, location of the subscriber.

4. The method according to claim 1, further comprising:
receiving a request from the communication network node to activate one of the number of second service-related products, the request using the sent policy settings for the one of the number of second service-related products previously sent by the policy control server to the communication network node, and
responsive to receiving the request, providing the one of the number of second service-related products to the communication network node.

5. The method of claim 1, wherein the communication node comprises at least one of a Gateway GPRS Support Node (GGSN) node, a Policy Charging Enforcement Function (PCEF) node, and a Packet Data Network Gateway (PDW) node of the communication network; and
wherein the policy control server comprises at least one of and Online Charging System (OCS) server and a Policy and Charging Rules Function (PCRF) server of the communication network.

6. The method of claim 5, wherein the policy settings request comprises a Credit Control Request-Initiate (CCR-I) message;
wherein the CCR-I message is received on a Gx interface of the policy control server; and
wherein sending the obtained policy settings to the communication node comprises sending the obtained policy settings through the Gx interface of the policy control server.

7. The method of claim 1, wherein first service-related product defines a first bandwidth available for the subscriber;
wherein the second service-related product defines a second bandwidth available for the subscriber; and
wherein the first and second bandwidths are different.

8. The method of claim 1, wherein obtaining the information of the number of first service-related products comprises obtaining the information of the number of first service-related products from a subscriber database connected to the policy control server; and
wherein obtaining the policy settings for the number of second products comprises obtaining the policy settings from the policy settings database connected to the policy control server.

9. A policy control server operable in a communication network, configured to facilitate provisioning of service-related products in the communication network, the policy control server comprising:
a processor and a memory, said memory containing instructions executable by said processor, whereby the processor when executing the instructions is operative to:
receive, from a node of the communication network, a policy settings request message, requesting charging policy settings for service-related products of a subscriber of the communication network, the message comprising a subscriber identity associated with the subscriber;
obtain, based on the received subscriber identity, information of a number of first service-related products that are provision-capable for the subscriber;
select, based on the information of the obtained number of first products, a number of second service-related products that are tentative for the subscriber;
obtain, in response to the selection, policy settings for the number of second service-related products, and
send, to the communication network node, the obtained policy settings for the number of second service-related products; and
remove the selected number of second service-related products and the policy settings for the selected number of second service-related products from a database of the policy control server in response to sending the obtained policy settings to the communication network node.

10. The policy control server according to claim 9, wherein the selecting of the number of second service-related products is also based on one or more charging parameter.

11. The policy control server according to claim 10, wherein the one or more charging parameter is taken from the following group of parameters: time of day, subscriber account balance, day of the week, location of the subscriber.

12. The policy control server according to claim 9, wherein said memory further contains instructions executable by said processor, whereby the processor when executing the further instructions is operative to:
receive a request from the communication network node for one of the number of second service-related products, the request using the sent policy settings for the one of the number of second service-related products previously sent by the policy control server to the communication network node, and
provide the one of the number of second service-related products to the communication network node in response to receiving the request.

13. The policy control server of claim 9, wherein the communication node comprises at least one of a Gateway GPRS Support Node (GGSN) node, a Policy Charging Enforcement Function (PCEF) node, and a Packet Data Network Gateway (PDW) node of the communication network; and
wherein the policy control server comprises at least one of and Online Charging System (OCS) server and a Policy and Charging Rules Function (PCRF) server of the communication network.

14. The policy control server of claim 13, wherein the policy settings request comprises a Credit Control Request-Initiate (CCR-I) message;
wherein the CCR-I message is received on a Gx interface of the policy control server; and
wherein said memory further contains instructions executable by said processor, whereby the processor when executing the further instructions is operative to:
send the obtained policy settings to the communication node through the Gx interface of the policy control server.

15. The policy control server of claim 9, wherein first service-related product defines a first bandwidth available for the subscriber;
wherein the second service-related product defines a second bandwidth available for the subscriber; and
wherein the first and second bandwidths are different.

16. The policy control server of claim 9, wherein said memory further contains instructions executable by said processor, whereby the processor when executing the further instructions is operative to:
obtain the information of the number of first service-related products from a subscriber database connected to the policy control server; and obtain the policy settings from the policy settings database connected to the policy control server.

17. A computer program embodied on a non-transitory computer readable code medium of a policy control server of a communication network, configured to facilitate provisioning of service-related products in the communication network, in which the computer program embodied on the non-transitory computer readable medium when executed by a processor of the policy control server causes the policy control server to:

receive, from a node of the communication network, a policy settings request message, requesting charging policy settings for service-related products of a subscriber of the communication network, the message comprising a subscriber identity associated with the subscriber;
 obtain, based on the received subscriber identity, information of a number of first service-related products that are provision-capable for the subscriber;
 select, based on the information of the obtained number of first products, a number of second service-related products that are tentative for the subscriber;
 obtain, in response to the selection, policy settings for the number of second service-related products, and
 send, to the communication network node, the obtained policy settings for the number of second service-related products; and
 remove the selected number of second service-related products and the policy settings for the selected number of second service-related products from a database of the policy control server in response to sending the obtained policy settings to the communication network node.

18. A policy control server operable in a communication network, configured for facilitating provisioning of service-related products in the communication network, the policy control server configured to:

receive, from a node of the communication network, a policy settings request message, requesting charging policy settings for service-related products of a subscriber of the communication network, the message comprising a subscriber identity associated with the subscriber;
 obtain, based on the received subscriber identity, information of a number of first service-related products that are provision-capable for the subscriber;
 select, based on the information of the obtained number of first products, a number of second service-related products that are tentative for the subscriber;
 obtain, in response to the selection, policy settings for the number of second service-related products, and
 send, to the communication network node, the obtained policy settings for the number of second service-related products; and
 remove the selected number of second service-related products and the policy settings for the selected number of second service-related products from a policy settings database connected to the policy control server in response to sending the obtained policy settings to the communication network node.

* * * * *